United States Patent [19]

Watanabe et al.

[11] Patent Number: 4,478,767
[45] Date of Patent: Oct. 23, 1984

[54] AIR COOLING DEVICE

[75] Inventors: Osamu Watanabe; Hisashi Tanaka, both of Yokohama; Hitoshi Yoshino, Matsudo; Toshiaki Sadamasu, Hiratsuka, all of Japan

[73] Assignee: Toshiba Corporation, Kawasaki, Japan

[21] Appl. No.: 447,959

[22] Filed: Dec. 8, 1982

Related U.S. Application Data

[63] Continuation of Ser. No. 237,480, Feb. 23, 1981, abandoned.

[30] Foreign Application Priority Data

Feb. 22, 1980 [JP] Japan ................................. 55-21132

[51] Int. Cl.$^3$ ............................................. B01F 3/04
[52] U.S. Cl. ..................................... 261/130; 62/310; 62/314; 261/26; 261/29; 261/36 R; 261/62; 261/110; 261/151; 261/DIG. 3
[58] Field of Search ................. 261/29, 36 R, 62, 110, 261/115, 118, 129, 130, DIG. 3, DIG. 15, DIG. 4, DIG. 34, 26, 30, 151, 98, 103; 159/4 F; 55/230; 236/44 B, 44 C; 422/4, 123; 62/310, 314, 304

[56] References Cited

U.S. PATENT DOCUMENTS

| | | | |
|---|---|---|---|
| 226,908 | 4/1880 | Edwards | 261/118 X |
| 1,457,087 | 5/1923 | Preble et al. | 261/DIG. 3 |
| 1,846,875 | 2/1932 | Karr et al. | 261/129 X |
| 2,084,514 | 6/1937 | Tuttle et al. | 261/DIG. 34 |
| 2,144,693 | 1/1939 | Seid | 261/DIG. 34 |
| 2,276,970 | 3/1942 | Hibberd | 261/151 X |
| 3,334,471 | 8/1967 | Herron | 261/DIG. 34 |
| 3,348,363 | 10/1967 | King, Jr. et al. | 261/26 X |
| 3,464,400 | 9/1969 | Wellman | 261/DIG. 34 |
| 3,494,109 | 2/1970 | Blazer et al. | 261/26 X |
| 3,738,621 | 6/1973 | Anderson | 261/DIG. 4 |
| 3,911,060 | 10/1975 | Bradley, Jr. et al. | 261/39 R X |
| 3,951,625 | 4/1976 | Follette | 261/130 X |
| 4,099,938 | 7/1978 | Onnen | 55/230 |

Primary Examiner—Richard L. Chiesa
Attorney, Agent, or Firm—Oblon, Fisher, Spivak, McClelland & Maier

[57] ABSTRACT

An air cooling device including a first water spray device, an air cooling part including a filler wherein cooling water sprayed from the first water spray device is brought into direct contact with intake air so that the intake air is cooled by the sprayed water through heat exchange therebetween on the surface of the filler, a first water reservoir that receives and reserves the water dropped from the filler and a cooling tower for rapidly cooling water to be sprayed in the air cooling part to a steady state condition prior to starting of an electrical apparata coupled to the air cooling device and to be cooled thereby. In the cooling tower, water from the first reservoir is sprayed into a second filler and thereby evaporatively cooled. The cooled water is collected in a second water reservoir and circulated therefrom to the first water spray device by means of a pump.

8 Claims, 5 Drawing Figures

AIR COOLING DEVICE

This is a continuation of application Ser. No. 237,480, filed Feb. 23, 1981, now abandoned.

BACKGROUND OF THE INVENTION

1. Field of the Invention

This invention relates to a device for cooling air which is dry and of high temperature.

2. Description of the Prior Art

In a steel manufacturing plant or the like, it is an ordinary practice to admit outside air of a comparatively low temperature through an air filter into a compartment equipped with a variety of electrical apparata so as to cool each apparatus.

Recently various plants such as steel manufacturing plants have been constructed in countries having a dry, hot climate, for example, Middle East countries. Intake of dry hot outside air in such countries directly, i.e., without cooling, into the aforenoted compartment can result in an ambient temperature of 50° C. or greater within the compartment which is in excess of the typical maximum allowable operating temperature, e.g., 40° C., above which adverse effects on the apparata can occur. To obviate such a difficulty, a heat exchanger comprising a number of cooling water tubes has been ordinarily used between an air filter and a blower sucking the air into the compartment.

Not only in the Middle East countries, but also in many countries throughout the world, multi-tube type heat exchangers are used in some special chemical plants and in the case, for instance, of recovering exhaust gases from boilers where high temperature dry air is to be cooled.

However, in the conventional device for cooling high temperature dry air, utilizing indirect conduction of heat between water and air, the cooling effect of air is not high, thus increasing the size and weight of the air cooling device and requiring a wider space for the installation. Furthermore, the air cooling device utilizing a multi-tube type heat exchanger requires a large quantity of cooling water to flow in a single pass or in a constantly circulating manner. Additionally, the maintenance of the heat exchanger is extremely troublesome because of the necessity of cleaning the complicated cooling water tubes.

SUMMARY OF THE INVENTION

Accordingly, one object of this invention is to provide a new and improved air cooling device which is highly effective for cooling air to be introduced into electrical apparata.

Another object of this invention is to provide a novel air cooling device which can reduce the quantity of cooling water used in cooling the intake air.

Still another object of this invention is to provide an air cooling device having decreased size and weight and which requires decreased space for installation therof.

Yet another object of this invention is to provide an air cooling device of the above noted type characterized by reduced maintenance of the tubing through which the cooling water circulates.

Still another object of this invention is to provide an air cooling device exhibiting reduced power consumption during operation.

Yet another object of this invention is to provide an air cooling device which can reduce the quantitiy of dust in the cooling air without the necessity of preparing a special air filter.

Another object of this invention is to provide an air cooling device characterized by rapid cooling from an initial temperature state to a steady state temperature, which can reduce the time necessary for preparatory operation thereof in attaining the steady state temperature.

Yet another object of this invention is to provide an air cooling device which reduces adverse effects on the electrical apparata to be cooled by the air cooling device during the preparatory operation thereof.

Still another object of this invention is to provide an air cooling device capable of controlling the ultimate temperature of the cooled air.

These and other objects are achieved according to the invention by providing a novel air cooling device utilizing characteristic features of dry, hot air and the evaporating nature of the cooling water as a basis of cooling air. According to the invention, there is provided an air cooling device comprising first means for spraying cooling water, an air cooling part into which intake air to be cooled is introduced and wherein the cooling water sprayed from the first water spray means is brought into direct contact with intake air so that the intake air is cooled by the water through heat exchange therebetween, means for cooling the water brought into heat exchange contact with the intake air, and means for returning the water circulated through the air cooling part to the first water spray means via the water cooling means.

In a preferred embodiment, the water cooling means of the air cooling device of this invention includes second means for spraying cooling water circulated from the air cooling part via the water returning means, and a water cooling part wherein the cooling water sprayed from the second water spray means is brought into direct contact with intake air through heat exchange therebetween.

In a preferred embodiment, the air cooling device of the invention further includes means for controlling the temperature of air cooled in the air cooling part. This may be implemented by means of a temperature sensor for detecting the temperature of the cooled air and means for controlling the flow rate of the circulating water according to the detected temperature. Alternatively, the detected temperature can be used to control the amount of incoming air subjected to heat exchange with the cooling water.

In one embodiment plural water spraying devices are mounted on a pivotably supported frame at the air cooling part. The frame is rotated in dependence on the detected temperature to control the amount of intake air coming into contact with the cooling water output from the spraying device, thereby controlling the temperature of the cooled air.

In yet another embodiment, the air cooling device is provided with the air cooling part including an air cooling passage wherein the cooling water sprayed from the first spray means is brought into direct contact with intake air introduced thereinto so that the air is cooled by the water through heat exchange therebetween, and an air cooling bypass passage through which intake air flows without being cooled. In this latter embodiment, cooled and non-cooled air passing through the two respective passages are combined, with the composite temperature of the combined air being controlled by controlling the amount of air allowed to pass through the bypass passage in accordance with the temperature detected by the temperature sensor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
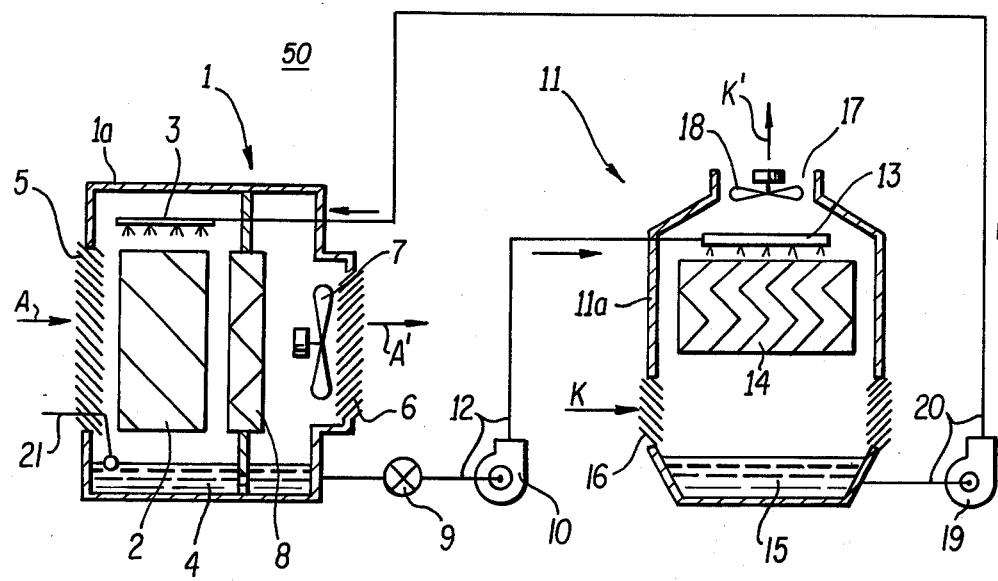
FIG. 1 is a schematic vertical cross-sectional view of an air cooling device according to a preferred embodiment of this invention.

Referring now to the drawings, wherein like reference numerals designate identical or corresponding parts throughout the several views, and more particularly to FIG. 1 thereof, wherein an air cooling device 50 according to a preferred embodiment of this invention is shown, the air cooling device 50 includes a main part 1 and means for cooling water for example, a cooling tower 11. In a casing 1a of the main part 1 of the air cooling device 50, there is provided an air cooling part comprising a filler 2. The filler 2 serves as a heat exchange material between air and water which are brought into direct contact with each other, and may be made of a substance chemically inactive and corrosion resistant. The filler 2 provides a large surface area per unit weight, and may be constituted by, for example, juxtaposed parallel sheets of fabric, wire nets or metal or resin plates. Above the filler 2 of the air cooling part, first means for spraying cooling water into the filler 2, for example, a first water spray device 3 is provided. Under the filler 2 of the air cooling part, first means for receiving and reserving the water dropping from the filler 2, for example, a first water reservoir 4 is provided. An air intake louver 5 is provided in a wall on one side of the casing 1a for introducing intake air A to be cooled, while an air outlet louver 6 is provided in a wall on the opposite side of the casing 1a. In front of the air outlet louver 6 there is provided a blower 7 for sending the cooled air A' to the electrical compartment or the like (not shown) outside the casing 1a, and there is also provided a water eliminator 8 which prevents any intrusion of cooling water droplets into the electrical compartment.

The first water reservoir 4 at the bottom of the casing 1a is connected through a strainer 9 to a first pump 10 used for circulating the cooling water in the first reservoir 4 through a first pipe line 12 to the cooling tower 11.

Cooling tower 11 includes a casing 11a in which is provided second means for spraying cooling water, for example, a second water spray device 13 connected to the first pipe line 12. Under the second water spray device 13, there is provided a water cooling part comprising a filler 14 which serves as a heat exchange material between air K and the water sprayed from the second water spray device 13, which are brought into direct contact with each other. The filler 14 may be constituted by, for example, juxtaposed parallel sheets of fabric, wire net or metal or resin plates. Under the filler 14, there is provided second means for receiving and reserving the water dropping from the filler 14, for example, a second water reservoir 15. An air intake louver 16 is provided in a wall on one side of the casing 11a for introducing air K for cooling water, while an air outlet louver 17 is provided in a wall on the top side of the casing 11a. Under the air outlet louver 17 there is provided a blower 18 for sending air K' to outside of the casing 11a, the second water reservoir 15 at the bottom of the casing 11a is connected to a second pump 19 used for circulating the cooling water in the second reservoir 15 through a second pipe line 20 to the first water spray device 3 of the main part 1. Furthermore, a water replenishing device 21 is connected to the water reservoir 4 which replenishes the cooling water therein.

In operation, the cooling water pumped up by the second pump 19 from the second reservoir 15 is carried to the first water spray device 3 through the second pipeline 20 and is sprayed downwardly from the first water spray device 3 over the filler 2, while intake air A that is to be cooled is introduced into the casing 1a through the air intake louver 5 by the blower 7. The water sprayed downwardly and the air flowing through the filler 2 are brought in direct contact with each other on the surface of the filler 2, and an amount of heat is exchanged between the air and the water.

The first water spray device 3 and the filler 2 are constructed so that the contact area between the cooling water sprayed into the filler 2 from the first water spray device 3 and the air flowing through the filler 2 becomes large, such that the intake air A is well cooled by direct contact with the water. Thus the cooled air passes through the eliminator 8 to eliminate water droplets contained in the cooled air, and is delivered to the electrical compartment (not shown) by the blower 7 through the air outlet louver 6 as the cooled air A'.

During the heat exchange operation in the filler 2 described above, a certain portion of the cooling water evaporates into the air, but the rest of the cooling water drops into the first water reservoir 4 under the filler 2 and is received and reserved therein. The reserved water in the first water reservoir 4 is circulated to the second water spray device 13 of the cooling tower 11 by means of the first pump 10. But when the sprayed water is brought into direct contact with the air in the filler 2, various foreign substances, such as dust, contained in the air, are transferred into the water and collected in the first water reservoir 4. The strainer 9 provided intermediately of the first pipe line 12 prevents the dust from being recirculated to the second water spray device 13 of the cooling tower 11.

The cooling water filtered by the strainer 9 is carried to the second water spray device 13 of the cooling tower 11 through the first pipe line 12 by the first pump 9 and is sprayed downwardly from the second water spray device 13 over the filler 14 of the water cooling part. On the other hand, the air K that has the same temperature and the same humidity as the air A is introduced into the casing 11a through the air intake louver 16 by the blower 18. The water sprayed downwardly and the air flowing through the filler 14 are brought into direct contact with each other on the surface of the filler 14, and an amount of heat is exchanged between the air and the water. As a result of this, the water is evaporatively cooled and drops into the second water reservoir 15 under the filler 14 and is received and reserved therein. The reserved water in the second water reservoir 15 is carried to the first water spray device 3 of the main part 1 again.

When the air cooling device 50 is operated for a long time, the quantity of the water in the first water reservoir 4 decreases, which lowers the level of the water in the first water reservoir 4 because of the evaporation into the air and carryover of the water. So the water replenishing device 21 is operated to compensate for the lost water.

Figure 2:
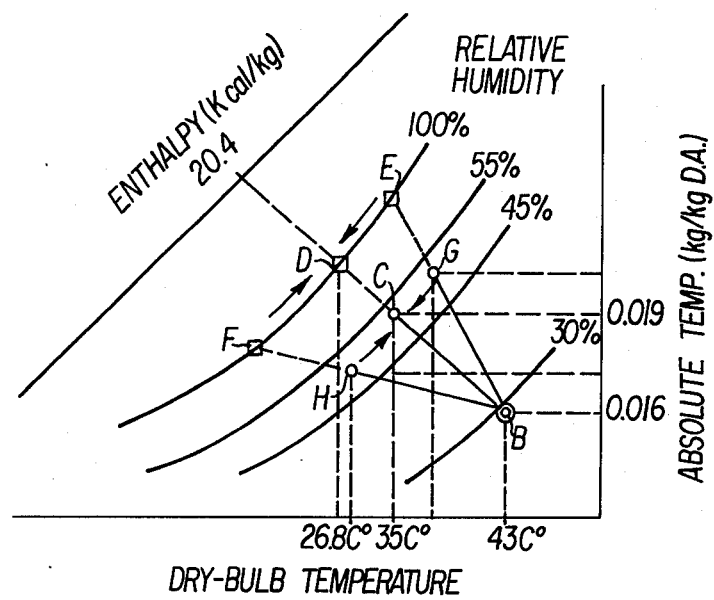
FIG. 2 is a graph for explaining the operation of the air cooling device embodying this invention.

FIG. 2 is a graphical representation for explaining the cooling effect of wet air. It is assumed that the air A to be cooled which is dry and of high temperature is, for instance, at a status point B (at a dry bulb temperature of 43° C. and a relative humidity of 29%, hereinafter written as 43° C., 29%) on a constant enthalpy line (20.4 Kcal/Kg). The air A is brought into contact with the sprayed water so as to exchange heat therebetween, and the air is thus cooled and in a stable state. If the air in the filler 2 is in the stable state, that may be considered to be in an adiabatic state, heat exchange between the sprayed water and the air becomes zero. In a stable state, the status of the air is shifted from the low humidity point B (43° C., 29%) toward a saturated humidity point D (26.8° C., 100%) on the same constant enthalpy line (20.4 Kcal/Kg) and finally reaches, for example, a status point C (35° C., 54%) determined by the performance of the filler 2. While in the stable state, the water also does not exchange heat with the air, so the status of the water becomes near the saturated humidity point D (26.8° C., 100%) that is a cross point of the saturated humidity line and the constant enthalpy line (20.4 Kcal/Kg).

When the temperature of the sprayed water at the time of the initiation of operation is higher than that of the point D, for example the water is at the point E, an amount of heat which is derived from the sprayed water as an evaporation latent heat is greater than the active heat acquired by the same water, thus lowering the sprayed temperature. Then, the status point of the water moves to the point D. Conversely, when the temperature of the sprayed water at the time of the initiation is lower than that of the point D, for example the water is at the point F, the active heat acquired by the sprayed water exceeds the latent heat consumed for evaporating a portion of the water. Thus the temperature of the sprayed water tends to rise twoard the point D. In each case described above, the air at the air outlet louver 6 at the time of the initiation of operation is at the status point G or H, respectively.

According to the air cooling device 50 described above, the temperature of the cooling water reaches the stable state within a certain time after the initiation of operation in spite of the temperature of the cooling water at the time of the initiation of operation. The temperature of the air at the air outlet louver 6 reaches the stable state after a certain time. The status of the cooled air is on the same constant enthalpy line as the status point of the intake air to be cooled and is determined by the performance of the filler. Thus, the dry-bulb temperature of the air to be cooled is decreased and the relative humidity of that is increased.

Nextly is described the starting of an air cooling device provided only with the main part 1 and not the cooling tower 11. When this air cooling device is started, the water reserved in the first water reservoir 4 of the main part 1 is of extremely high temperature as a result of the climate conditions in Middle East countries where outdoor air is dry and of high temperature. As it takes a long time for the temperature of the cooling water to reach the stable steady state described above, preparatory operation of this air cooling device, wherein the temperature of the cooling water is cooled, is necessary before starting of the electrical apparata to be cooled by the air cooling device. During preparatory operation, as the temperature of the cooling water is very high, the air supplied to the compartment equipped with the electrical apparata from the air cooling device is in a state of extremely high humidity, which may adversely effect the electrical apparata. However, the air cooling device 50 according to this invention provides not only the main part 1 but also the cooling tower 11. The cooling water in the first water reservoir 4 of the main part 1 is supplied to the first water spray device 3 of the main part 1 after being cooled in the cooling tower 11. Therefore this invention reduces the time necessary for preparatory operation of the air cooling device 50, reduces the amount of air of high humidity from being supplied to the compartment and reduces adverse effects on the electrical apparata in the compartment.

In the air cooling device 50 described above, the quantity of the filler 2 is determined under the condition that the outside air is at the maximum dry-bulb temperature in the year. So, if this device 50 is operated without regard to the change of the temperature of the outside air, when the temperature of the outside air decreases the temperature of the air at the outlet of this air cooling device 50 becomes lower than the necessary temperature and the relative humidity thereof becomes higher than the necessary value.

According to this invention, however, means for controlling the temperature of the air cooled in the air cooling device can be provided.

Figure 3:
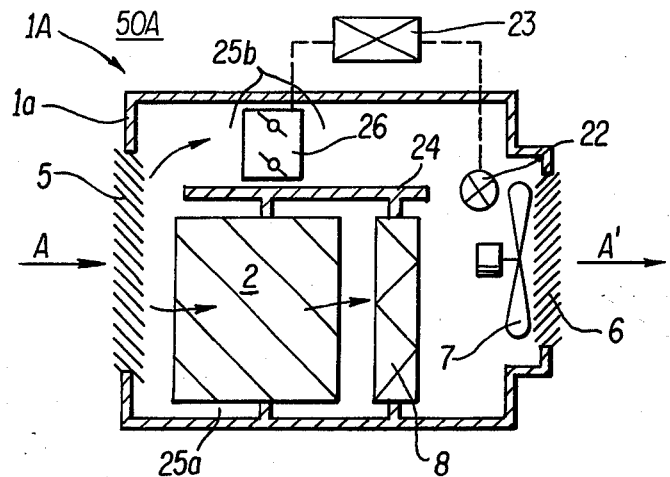
FIG. 3 is a schematic plan cross-sectional view of an air cooling device according to another preferred embodiment of this invention.

FIG. 3 shows an air cooling device 50A according to another preferred embodiment of this invention, which has means for controlling the temperature of the cooled air. In FIG. 3, only main part 1A of the air cooling device 50A is shown, but there is provided the cooling tower 11 (not shown) connected to the main part 1A. In FIG. 3 near the air outlet louver 6 there is provided means for detecting the temperature of the cooled air at that position, for example, a temperature detector 22. An output signal from the temperature detector 22 is applied to an air flow rate control device 23.

An air cooling part in the air cooling device 50A includes two parts. Namely, the interior of the casing 1a of the main part 1A of the air cooling device 50A is divided into two passages by a partition wall 24. One passage constitutes an air cooling passage 25a and is provided with the filler 2 and the water eliminator 8. It is understood that there is provided a first water spray device 3 (not shown) above this passage 25a. The other passage constitutes an air cooling bypass passage 25b whereby a portion of the intake air A from the air intake louver 5 bypasses the filler 2. The air cooling bypass passage 25b comprises means for regulating air flow therethrough, for example, a damper 26, which is controlled by an air flow rate control device 23. The temperature of the air near the air outlet louver 6 is detected by the temperature detector 22 and applied to the air flow rate control device 23, which generates an output signal for controlling the position of damper 26.

If the temperature of the intake air A that is to be cooled decreases, that of the cooled air A' also decreases. As the temperature of the air near the outlet louver 6 is detected by the temperature detector 22, which generates a temperature output signal applied to the air flow rate control device 23, if the output signal of the temperature detector 22 drops below a predetermined value, the air flow rate control device 23 generates an output signal to the damper 26 that increases the opening of the damper 26. Thus, some part of the air introduced from the air intake louver 5 flows through the air cooling bypass passage 25b and this causes the flow rate of the air that flows in the air cooling passage 25a to decrease. As a result, some part of the air introduced from the intake louver 5 flows through the air cooling bypass passage 25b as hot, dry air without direct contact with the cooling water, and is mixed with the air passed through the air cooling passage 25a, which is cooled. So the temperature of the air near the air outlet louver 6 increases near the predetermined value and the relative humidity thereof decreases.

On the contrary, if the temperature of the outside air increases, the temperature of the air A' near the outlet louver 6 correspondingly increases, so that the opening of the damper 26 is decreased. As a result of this, the air flowing through the air cooling passage 25 increases, so that the temperature of the air A' near the air outlet louver 6 decreases near the predetermined value and the relative humidity thereof increases.

As described above, the cooled air reaches a stable steady state condition where the humidity of the cooled air is low and the temperature thereof is near the predetermined value.

Figure 4:
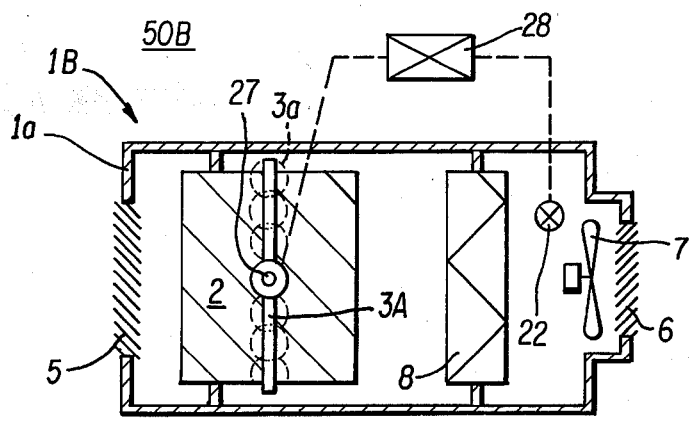
FIGS. 4 and 5 are schematic plan cross-sectional views of an air cooling device according to still another preferred embodiment of this invention.
Figure 5:
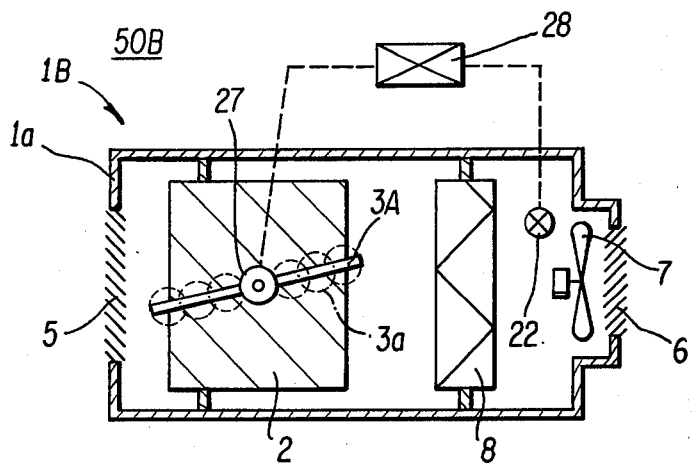

FIGS. 4 and 5 show an air cooling device 50B according to still another embodiment of this invention, which has another means for controlling the temperature of the cooled air. In FIGS. 4 and 5 only main part 1B of the air cooling device 50B is shown, but there is provided the cooling tower 11 (not shown) connected to the main part 1B.

In FIGS. 4 and 5, above the filler 2 of the air cooling part first means for spraying cooling water into the filler 2, for example, a first water spray device 3A is provided horizontally transverse to the flow direction of intake air A through the main part 1B of the air cooling device 50B. The first water spray device 3A has water spray nozzles 3a along the longitudinal direction thereof. At a pivot point of the first water spray device 3A, a torque motor 27 is provided which can rotate the first water spray device 3A around the vertical axis. The torque motor 27 is controlled by the output signal of a control device 28 for controlling the temperature of cooled air A'. The control device 28 generates a motor drive signal in accordance with the temperature signal of the temperature detector 22 for controlling the rotational position of the motor shaft and therefore the angle of water spray device 3A with respect to filler 2.

If the temperature of the outside air is at the maximum value that has been decided by the design conditions of the air cooling device 50B, this causes the temperature of the air near the air outlet louver 6 to be correspondingly high, which is detected by the temperature detector 22. Temperature detector 22 then generates a temperature output signal which is applied to the control device 28. The first water spray device 3A is rotated by the torque motor 27 to the position corresponding to the output signal of the control device 28 such that the first water spray device 3A is arranged perpendicular to the air flow direction shown in FIG. 4. The first water spray device 3A being in this position, all surfaces of the filler 2 are sprayed with cooling water and the cooling effect is maximum.

On the contrary, as the temperature of the outside air decreases, the temperature near the outlet louver 6 decreases too. The torque motor 27 is operated by the output signal of the control device 28 to rotate the first water spray device 3A to a position at a certain angle to the air flow direction, for example as shown in FIG. 5. The first water spray device 3A being in this position, some part of the surface of the filler 2 is not sprayed with cooling water and the cooling effect decreases. As described above, the temperature near the outlet louver 6 is fixed near the predetermined value by controlling the sprayed area in the filler 2 according to the temperature of the air near the outlet louver 6.

In the embodiments of this invention described above, there is provided one air cooling part in a main part of an air cooling device, but an air cooling device can be provided with a plurality of air cooling parts in a main part that are arranged in parallel or in series with each other. Also an air cooling part can be so constructed that the air contacts directly with sprayed water without providing any filler.

Moreover the cooling function of the circulation cooling water in the cooling tower 11 becomes unnecessary when the temperature of the cooling water reaches a stable steady state temperature after the air cooling device is started. Therefore the blower 18 in the cooling tower 11 may be stopped by stopping the motor (not shown) for driving the blower 18 either under the control of a timer for a predetermined time after the air cooling device is started, or when the temperature of the circulating cooling water detected by a temperature detector (not shown) is reduced to the wet-bulb temperature of the outside air.

First means for spraying cooling water is not restricted to those described in the above-mentioned embodiments. For example, a fixed type water spray device having a plurality of water spray nozzles with a water flow rate regulating valve can be used, wherein each of the water flow rate regulating valves is controlled to be opened or closed by a water flow rate control device according to the temperature of the cooled air.

A water spray device can be provided without a water flow rate regulating valve, and the rotating speed of one or more pumps can be controlled by the output of the water flow rate control device. Also, a damper as a means for regulating the air flow rate through the air cooling bypass passage can be provided at the entrance of the air cooling bypass passage, or one or more dampers can be installed in the air cooling passage to regulate the amount of cooling.

According to the invention described above, the intake air is cooled by direct contact with the sprayed water, while the air is cooled by indirect contacting with the water in the conventional device. This invention provides an air cooling device which can make the air cooling effect high and which can reduce the quantity of cooling water used for cooling air.

This invention provides an air cooling device having decreased size and weight and which requires decreased space for installation. Furthermore, according to the invention, the maintenance of the tubes for circulating cooling water is reduced, because the invention does not use a multi-tube type heat exchanger as in the conventional air cooling device.

As this invention uses characteristic features of dry, hot air and the evaporating nature of the cooling water, this invention can provide an air cooling device exhibiting reduced electric power consumption during operation.

This invention also provides an air cooling device which reduces the quantity of dust in the cooling air without the necessity of the special air filters because the air is cooled by direct contact with the sprayed water and the dust in the cooling air is trapped in the sprayed water.

As this invention provides means for cooling water, this invention can provide an air cooling device which can reduce the time necessary for preparatory operation thereof.

Furthermore this invention provides an air cooling device which controls the ultimate temperature of the cooled air, due to the provision of means for controlling the temperature of the cooled air in the air cooling device.

Obviously, numerous additional modifictions and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for cooling and humidifying dry, hot air comprising:
   first means for spraying cooling water;
   an air cooling part wherein the cooling water sprayed from said first water spray means is brought into direct contact with intake air introduced thereinto from outside of said air cooling device so that said intake air is cooled and humidified by said water through active heat exchange and latent heat exchange caused by evaporation of said cooling water into said air;
   means for cooling water brought into heat exchange contact with said intake air;
   means for returning the sprayed water brought into heat exchange with said intake air in said air cooling part to said first water spray means via said water cooling means, wherein said water is circulated to said first water spray means after being cooled in said water cooling means;
   means for controlling the temperature of the air cooled in said cooling device wherein said air cooled in said air cooling part is adapted to be fed to a compartment equipped with electrical apparatus to thereby reduce the time necessary for preparatory operation of said air cooling device and reducing adverse effects on said electrical apparatus;
   wherein said means for controlling the temperature of the cooled air includes a means for detecting the temperature of the said cooled air, said temperature detecting means being located near an output louver of said air cooling part;
   wherein said water returning means further includes a first means for receiving and reserving water that has passed through said air cooling part and a means for circulating water from said first means for receiving and reserving water to said first water spray means via said water cooling means, wherein said water is circulated to said first water spray means after being cooled in said water cooling means;
   wherein said first means for receiving and reserving water includes a first water reservoir;
   wherein said means for circulating water includes a first pump for circulating the water in said first water reservoir to said water cooling means and a second pump for circulating the water cooled in said water cooling means to said first water spray means;
   wherein said water cooling means includes:
   second means for spraying cooling water circulated from said first reservoir by said first pump;
   a water cooling part wherein the water sprayed from said second water spray means is brought into direct contact with intake air introduced thereinto from outside of said air cooling device so that said water is evaporatively cooled;
   a second water reservoir for receiving and reserving said water circulated in said water cooling part; and
   wherein said water reserved in said second water reservoir is circulated to said first water spray means by said second pump.

2. An air cooling device according to claim 1, wherein said water cooling part comprises:
   a filler;
   wherein the cooling water sprayed from said second water spray means is brought into direct contact with the intake air on the surface of said filler.

3. An air cooling device according to claim 2, wherein said air cooling part comprises:
   a filler;
   wherein the cooling water sprayed from said first water spray means is brought into direct contact with the intake air to be cooled on the surface of said air cooling part filler.

4. An air cooling device according to claim 3, wherein said temperature controlling means comprises:
   means for controlling the flow rate of the said circulating water of said first water spray means according to the temperature detected by said temperature detecting means.

5. An air cooling device according to claim 4, wherein:
   said first water spray means comprises at least one water spray nozzle provided with a water flow rate regulating valve; and
   said means for controlling the flow rate of said circulating water comprises means for controlling said water flow rate regulating valve according to the temperature detected by said temperature detecting means.

6. An air cooling device according to claim 3, wherein said first water spray means comprises:
   plural water spray nozzles arranged in a row;
   a torque motor adapted to rotate said row of water spray nozzles; and
   wherein said temperature controlling means comprises;
   means for controlling the rotation of said torque motor according to the temperature detected by said temperature detecting means so that an angle between said row and the flow direction of said air is changed between 0° and 90° according to the temperature detected by said temperature detecting means such that the area in which said cooling water is sprayed in said air cooling part is changed.

7. An air cooling device according to claim 3, further comprising:

blower means for sending the air in said water cooling part to outside of said water cooling part; and timer means for stopping operating said blower means at a predetermined time after said air cooling device is started.

8. An air cooling device according to claim 3, further comprising:

blower means for sending the air in said water cooling part to outside of said water cooling part; and means for detecting temperature of said sprayed water and for stopping operating said blower means when said temperature of said sprayed water is reduced to a predetermined temperature.

* * * * *